United States Patent
Yamada et al.

(10) Patent No.: US 10,339,432 B2
(45) Date of Patent: Jul. 2, 2019

(54) COMMUNICATION DEVICE

(71) Applicant: SONY CORPORATION, Tokyo (JP)

(72) Inventors: Takayuki Yamada, Tokyo (JP);
Masayuki Ishikura, Kanagawa (JP);
Shino Ogasahara, Kanagawa (JP);
Masashi Ishikawa, Kanagawa (JP);
Yuhu Wang, Tokyo (JP); Hitoshi Miki,
Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/742,949

(22) PCT Filed: May 27, 2016

(86) PCT No.: PCT/JP2016/065709
§ 371 (c)(1),
(2) Date: Jan. 9, 2018

(87) PCT Pub. No.: WO2017/013940
PCT Pub. Date: Jan. 26, 2017

(65) Prior Publication Data
US 2019/0005367 A1    Jan. 3, 2019

(30) Foreign Application Priority Data

Jul. 21, 2015 (JP) ................. 2015-144160

(51) Int. Cl.
*G06K 7/10* (2006.01)
*G06K 19/07* (2006.01)
(Continued)

(52) U.S. Cl.
CPC ....... *G06K 19/0704* (2013.01); *G06F 1/1601* (2013.01); *G06F 1/1635* (2013.01);
(Continued)

(58) Field of Classification Search
USPC ..................... 235/472.01–472.03
See application file for complete search history.

(56) References Cited

U.S. PATENT DOCUMENTS

2001/0020897 A1    9/2001  Takatori et al.
2012/0234922 A1*   9/2012  Sample .............. G06K 19/0704
                                                              235/492

FOREIGN PATENT DOCUMENTS

JP    2001-256452 A    9/2001
JP    2003-167233 A    6/2003
(Continued)

OTHER PUBLICATIONS

International Search Report and Written Opinion of PCT Application No. PCT/JP2016/065709, dated Aug. 2, 2016, 7 pages of ISRWO.

*Primary Examiner* — Jamara A Franklin
(74) *Attorney, Agent, or Firm* — Chip Law Group

(57) ABSTRACT

To propose a novel and improved communication device which is capable of improving user convenience. Provided is a communication device, including: a solar cell including a light receiving surface configured to receive radiated light; an electric storage device that is installed on a back surface of the light receiving surface; and a circuit board that includes a communication antenna and is installed on a back surface of an opposite surface of the electric storage device to the solar cell.

17 Claims, 14 Drawing Sheets

(51) Int. Cl.
*G06K 19/077* (2006.01)
*G06F 1/16* (2006.01)

(52) U.S. Cl.
CPC ........... *G06F 1/1684* (2013.01); *G06K 19/07* (2013.01); *G06K 19/077* (2013.01); *G06F 1/163* (2013.01); *G06F 1/1626* (2013.01)

(56) References Cited

FOREIGN PATENT DOCUMENTS

JP        2010-067007 A     3/2010
JP        2012-133548 A     7/2012

* cited by examiner

COMMUNICATION DEVICE

CROSS REFERENCE TO RELATED APPLICATIONS

This application is a U.S. National Phase of International Patent Application No. PCT/JP2016/065709 filed on May 27, 2016, which claims priority benefit of Japanese Patent Application No. JP 2015-144160 filed in the Japan Patent Office on Jul. 21, 2015, Each of the above-referenced applications is hereby incorporated herein by reference in its entirety.

TECHNICAL FIELD

The present disclosure relates to a communication device.

BACKGROUND ART

In recent years, communication devices such as wearable devices have become widespread. Power consumption in such communication devices is high compared to the sizes of the communication devices. For this reason, development of technology to prevent a shortage of electric power in communication devices has been promoted. For example, a thin identification device in which a solar cell is arranged on a substrate so that electric power can be generated at a reduced size is disclosed in Patent Literature 1.

CITATION LIST

Patent Literature

Patent Literature 1: JP 2010-67007A

DISCLOSURE OF INVENTION

Technical Problem

However, in Patent Literature 1 above, the solar cell is arranged on the substrate so that it does not interfere with other members such as an antenna or a communication member installed on the same substrate. In this case, since an area of a light receiving surface of the solar cell is limited, the size of the communication device becomes smaller, and the interference caused by the installation of other members becomes larger, and as a result, it is necessary to reduce the size of the solar cell, and a power generation amount is reduced. For this reason, the communication device may run out of electric power in a short period of time. Thus, because a use frequency or a purpose of the communication device as described above is limited, user convenience is degraded.

In this regard, the present disclosure proposes a novel and improved communication device which is capable of improving user convenience.

Solution to Problem

According to the present disclosure, there is provided a communication device, including: a solar cell including a light receiving surface configured to receive radiated light; an electric storage device that is installed on a back surface of the light receiving surface; and a circuit board that includes a communication antenna and is installed on a back surface of an opposite surface of the electric storage device to the solar cell.

In addition, according to the present disclosure, there is provided a communication device, including: a solar cell including a light receiving surface configured to receive radiated light; a circuit board that is installed on at least a part of a back surface of the light receiving surface; an electric storage device configured to be able to store electric power generated by the solar cell; and a communication antenna that is installed to surround a part or a whole of at least one of the solar cell, the circuit board, and the electric storage device.

Advantageous Effects of Invention

As described above, according to the present disclosure, it is possible to improve user convenience.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
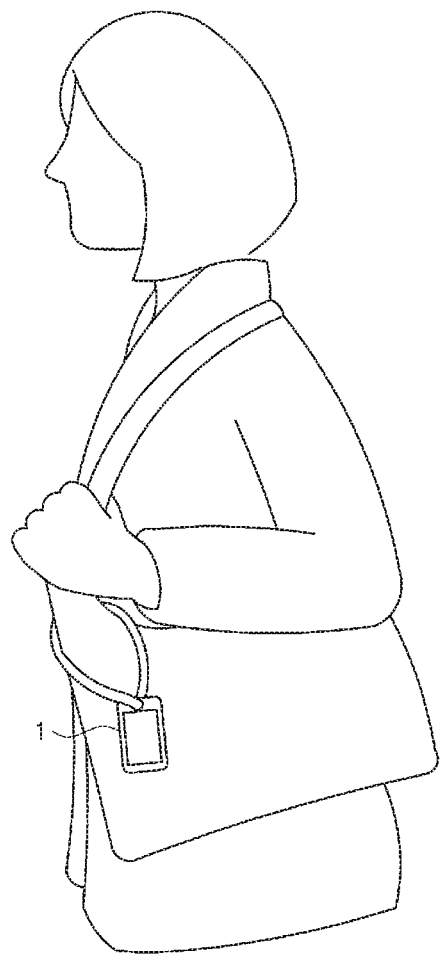
FIG. 1 is an overview of a communication device according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will proceed in the following order.
1. Overview of communication device
2. First Embodiment
2-1. Configuration of communication device
2-2. Arrangement of components
2-3. Modified example of configuration
3. Second Embodiment
4. Third Embodiment
5. Fourth Embodiment
5-1. Configuration and arrangement of communication device
5-2. Modified example of configuration
6. Conclusion <1. Overview of Communication Device>

FIG. 1 illustrates an overview of a communication device 1 according to one embodiment of the present disclosure. The communication device 1 is, for example, a communication device which is carried by a user and includes a communication antenna or the like to perform communication with an external communication device. More specifically, when the user brings one surface (upper surface) of a housing constituting the communication device 1 close to the external communication device, the communication device 1 is able to perform communication with the external communication device and perform a predetermined process in accordance with communication content. The communication device 1 may perform communication using a near field communication standard such as FeliCa (a registered trademark), Bluetooth low energy (BLE), or a radio frequency identifier (RFID). In this case, the communication device 1 may, for example, be equipped with an IC chip or an antenna for the near field communication. Further, the external communication device described above may be, for example, an information communication terminal such as a smartphone, a tablet, a personal computer (PC), or a smart watch or a contactless reader/writer. Further, the predetermined process may be, for example, an electronic money settlement process such as payment and charging. In this case, a program related to a plurality of electronic money settlement processes may be stored in one IC chip. Accordingly, the user is able to use a plurality of electronic moneys using the communication device 1.

Here, if the communication device 1 is made smaller, a volume and a weight of the communication device 1 are reduced, and so the user is able to carry the communication device 1 more easily. Accordingly, the user is able to carry the communication device 1 in various forms. For example, as illustrated in FIG. 1, the communication device 1 may be hung on a bag or the like carried by the user by attaching it to a strap or the like or attached to a bag or the like through a holding member such as a hook or a clip. Further, the communication device 1 may be hung on a part of the body such as the neck or an arm of the user by means of a necklace, a strap, or the like or may be attached to other miscellaneous goods or devices carried by the user such as wallets, card cases, wristwatches, mobile phones, smart phones, or tablets.

In a case in which the communication device 1 performs communication with the external communication devices described above, it is necessary to perform transmission and reception of carrier waves between the communication device 1 and the external communication devices. In this case, the communication device 1 may need to consume electric power stored in the communication device 1 and perform communication depending on a type of external communication device which is a communication target.

Here, in a case in which the size of the communication device 1 is made small, the carrying convenience is improved, but since a size of an electric storage device that stores the electric power in the communication device 1 is also small, an electric storage capacity of the communication device 1 is also reduced. Therefore, in a case in which communication associated with power consumption is performed, it is necessary to frequently charge the communication device 1. However, charging the communication device 1 frequently is a great burden on the user.

In this regard, technology development has been promoted for communication devices having a self-power generation mechanism such as an energy harvest. For example, JP 2010-67007A discloses a technique in which a solar cell is arranged on a circuit board of a small-sized communication device. It is described that, through this technique, the communication device is able to perform self-power generation. Accordingly, it is possible to save time and effort of frequently charging the communication device.

However, according to the technique disclosed in the above-mentioned literature, the solar cell is arranged on the same substrate as other electronic members so that it does not interfere with other electronic members such as an antenna and a communication member installed on the substrate. In this case, it is necessary to reduce the size of the solar cell, and the area of the light receiving surface of the solar cell is limited. Therefore, in a case in which the communication device is further reduced in size, the electric power for performing communication may be insufficient. Therefore, the frequency or the purpose in which the user can use the communication device as described above is limited.

In view of the above-described circumstances, a communication device in which an arrangement of each internal component is optimized is provided in light of the above circumstances. With the communication device 1 according to the present disclosure, it is possible to increase the power generation amount obtained by the solar cell, and thus it is possible to increase the use frequency or the use purposes of the communication device. Accordingly, user convenience is improved. Hereinafter, a configuration and an operation of the communication device 1 according to the present disclosure will be specifically described.

<2. First Embodiment>

[2-1. Configuration of Communication Device]

(External Configuration)

Figure 2:
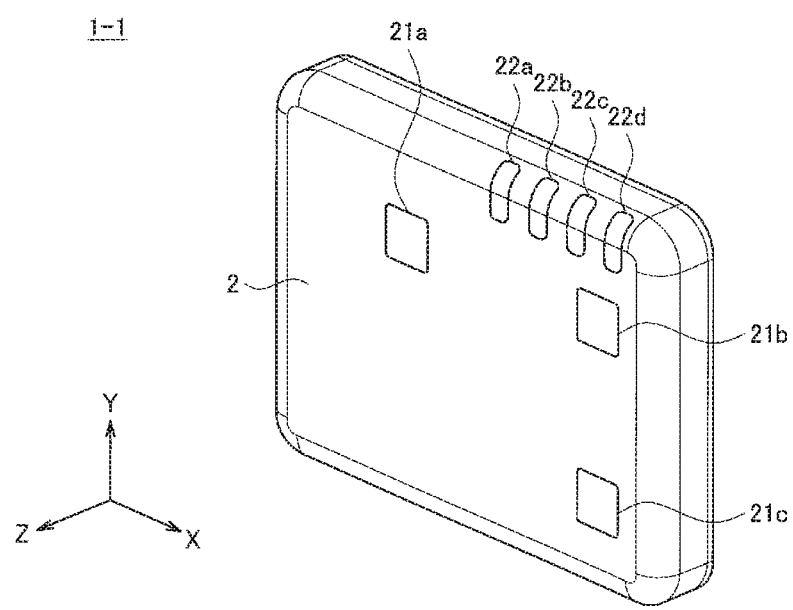
FIG. 2 is a diagram illustrating an external configuration example of a communication device according to a first embodiment of the present disclosure.

FIG. 2 illustrates an external configuration example of the communication device 1-1 according to a first embodiment of the present disclosure. Referring to FIG. 2, the communication device 1-1 according to the first embodiment of the present disclosure includes a housing 2. The housing 2 accommodates each constituent member of the communication device 1-1 to be described later. The housing 2 has a substantially rectangular parallelepiped shape, and the corners of the housing 2 are rounded for dispersion of collision force at the time of falling or the like. A material for forming the housing 2 may be any material, for example, resin such as plastic, a compound material, or the like. In order to prevent the communication performance from being lowered, for example, the housing 2 is preferably formed by a material containing no metal. Further, the housing 2 includes buttons 21*a* to 21*c* and display windows 22*a* to 22*d*.

The button 21 is an example of an input member of the communication device 1-1. When the user performs an input operation via the button 21, the communication device 1-1 can perform a predetermined processing operation. For example, when the user performs an input operation, the communication device 1-1 may select a type of electronic money used for a settlement process or display the balance of the described-above electronic money or a remaining amount of an electric storage device 5 to be described later through a display window 22. Further, the communication device 1-1 may communicate with the information communication terminal described above when the user performs an input operation. Note that the number of buttons 21 to be installed and an installation position of the button 21 are not particularly limited.

The display window 22 is a member for indicating states of various kinds of processes executed by the communication device 1-1 to the user. The display window 22 may be formed of a transparent or translucent material, or the like in order to enable the user to visually recognize a display state of a display member 72 arranged on a circuit board 7 to be described later. Accordingly, it is possible to display the states of various kinds of processes. For example, the communication device 1-1 may display the type of electronic money selected by the user, the communication state with the external communication device, the remaining amount of the electric storage device 5, and the like through the display window 22. Note that the number of display windows 22 to be installed and an installation position of the display window 22 are not particularly limited.

Figure 3:
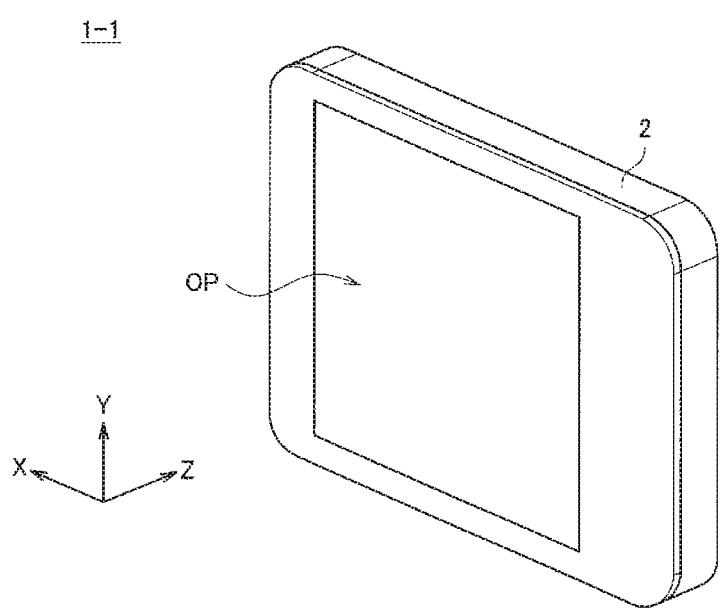
FIG. 3 is a diagram of the external configuration example of the communication device according to the first embodiment of the present disclosure illustrated in FIG. 2 which is viewed from an opposite side.

FIG. 3 illustrates the external configuration example of the communication device 1-1 according to the first embodiment of the present disclosure illustrated in FIG. 2 which is viewed from an opposite side. Referring to FIG. 3, the housing 2 includes an opening portion OP on the other surface facing the surface having the button 21 and the display window 22. The opening portion OP is an opening formed to radiate light onto a light receiving surface of a solar cell 4 stored in the housing 2 and is formed at a position corresponding to the light receiving surface.

(Internal Configuration)

Figure 4:
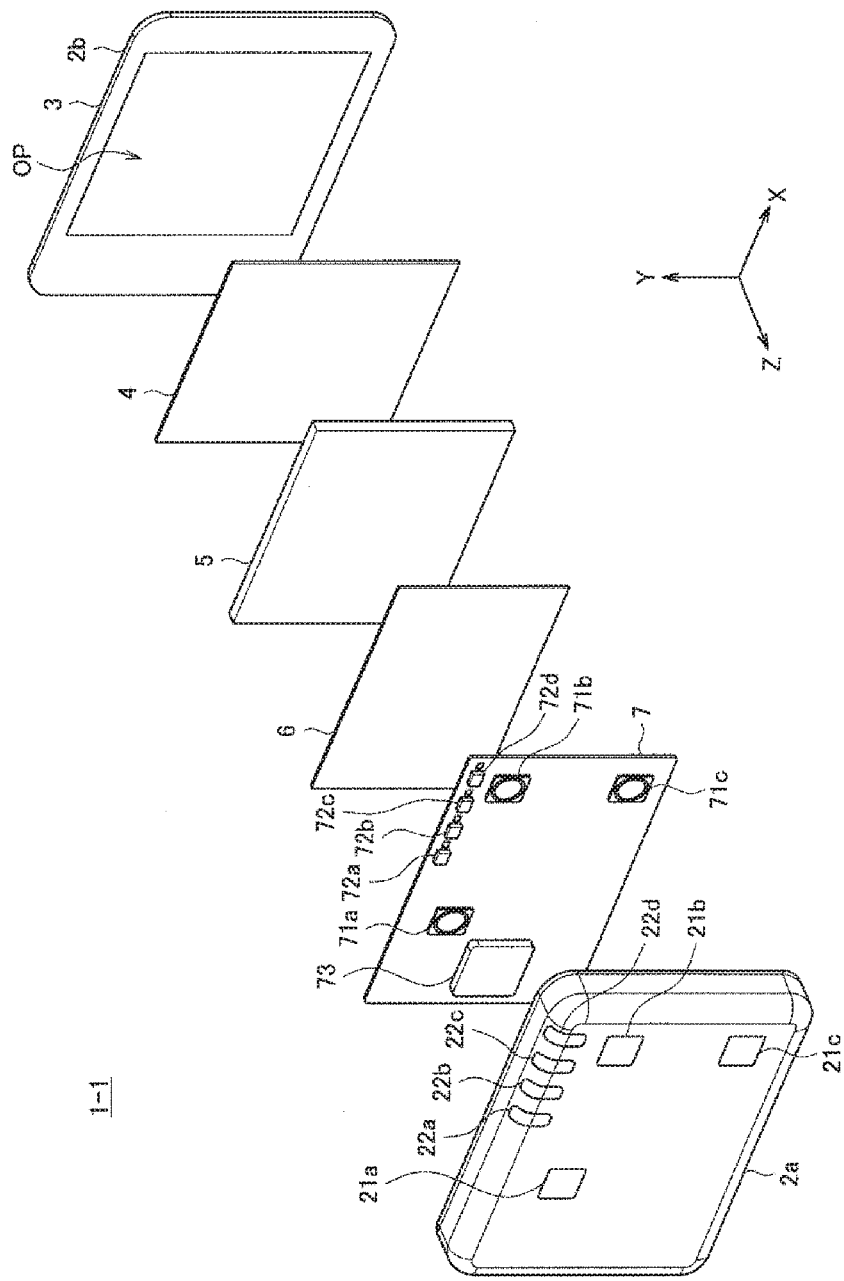
FIG. 4 is an exploded perspective view illustrating an internal configuration example of the communication device according to the first embodiment of the present disclosure.

FIG. 4 illustrates an internal configuration example of the communication device 1-1 according to the first embodiment of the present disclosure. Referring to FIG. 4, the communication device 1-1 accommodates the solar cell 4, the electric storage device 5, a magnetic sheet 6, and the circuit board 7 in a space closed by housings 2*a* and 2*b*. The housing 2 is separable into the housings 2*a* and 2*b*. A configuration of the housing 2*a* is the same as that illustrated in FIG. 2, and thus description thereof is omitted. The housing 2*b* is a part of the housing 2 and includes a surface containing the opening portion OP. Further, the housing 2*b* may be provided with a transparent protection member 3 covering the light receiving surface of the solar cell 4.

The protection member 3 is a member for protecting the light receiving surface of the solar cell 4. For example, the protection member 3 may be formed to cover the opening portion OP. Thus, the light receiving surface of the solar cell 4 exposed to the outside of the housing 2 via the opening portion OP can be protected. Further, it is preferable that the protection member 3 is formed of a transparent material so that light is radiated onto the light receiving surface of the solar cell 4. For example, the protection member 3 may be formed of transparent resin such as acryl, poly methyl methacrylate (PMMA), polycarbonate, polyethylene terephthalate (PET), glass or the like. Further, the protection member 3 may be a transparent resin film, a transparent coated film, or the like. Note that the protection member 3 may be bonded onto at least one surface of the housing 2*b* or may face or be bonded to the light receiving surface of the solar cell 4.

The solar cell 4 is a battery that generates electric power by receiving light radiated from the outside through the light receiving surface and converting light energy into electric energy. The type of solar cell 4 is not particularly limited. For example, in the present technology, a wide variety of solar cells such as a solar cell using a single crystalline or polycrystalline silicon, a thin-film silicon solar cell, or a CIGS-based solar cell can be used. The light receiving surface of the solar cell 4 is positioned to face the housing 2*b* and receives light passing through the opening portion OP of the housing 2*b*. The light received by the light receiving surface may be, for example, natural light such as sunlight or may be light emitted from a light emitter such as a fluorescent lamp or an LED. The generated electric power is stored in the electric storage device 5.

The electric storage device 5 is a battery that stores electric power including electric power generated by the solar cell 4. The type of electric storage device 5 is not particularly limited. For example, in the present technology, a variety of secondary batteries such as a lithium-ion battery, a nickel-hydrogen battery, and a nickel-cadmium battery can be used as the electric storage device. Further, the electric storage device 5 may be a capacitor such as an electric double layer capacitor. The electric storage device 5 is arranged on a back surface of the light receiving surface of the solar cell 4. The electric power stored in the electric storage device 5 can be consumed to drive the respective members arranged on the circuit board 7 to be described later. Note that the electric storage device 5 may store electric power supplied from a power source and a battery other than the solar cell 4. For example, the electric storage device 5 may acquire electric power from an external power source through a port (not illustrated) or the like formed in the housing 2 and store the acquired electric power.

The magnetic sheet 6 is a sheet having a high magnetic property and shields magnetism generated from the antenna by communication. The magnetic sheet 6 may be, for example, a sheet formed of a sintered body of ferrite. Here, in a case in which communication is performed using the communication antenna installed on the circuit board 7, since the electric storage device 5 which may contain a magnetic metal is present near the antenna, an eddy current flows into the inside of the electric storage device 5 due to the magnetism generated from the antenna. In this case, a magnetic field is generated by the eddy current, and the magnetic field interferes with a radio wave of the antenna. Therefore, noise may be generated in the radio wave generated from the antenna. As a result, the communication quality of the communication device 1-1 is likely to deteriorate. For this reason, it is necessary to arrange the magnetic sheet 6 between the electric storage device 5 and the circuit board 7. Accordingly, since the magnetic sheet 6 shields the magnetism generated from the antenna, the generation of the eddy currents in the electric storage device 5 is suppressed. Accordingly, it is possible to prevent the radio wave generated by the antenna from being interfered and prevent the communication quality of the communication device 1-1 from deteriorating. Note that the size of the magnetic sheet 6 is preferably large enough to cover a part or the whole of the opposite surface of the electric storage device 5 facing the magnetic sheet 6. With this configuration, the magnetic sheet 6 can more effectively shield the radio wave from entering the electric storage device 5. Thus, the communication quality of the communication device 1-1 can be prevented from further deteriorating.

The circuit board 7 is a substrate on which electronic members performing each function of the communication device 1-1 are arranged. For example, an input receiving unit 71, the display member 72, a microcontroller 73, an IC chip (not illustrated), and an antenna (not illustrated) may be installed on the circuit board 7. The circuit board 7 faces the inner surface of the housing 2a, and the electronic circuit is installed on the opposite surface of the circuit board 7 facing the inner surface of the housing 2a. For example, the input receiving unit 71, the display member 72, and the microcontroller 73, and the IC chip (not illustrated) may be arranged in the electronic circuit described above. The antenna may be installed at an arbitrary position of the circuit board 7 and may be installed, for example, on the opposite surface of the circuit board 7 to the magnetic sheet 6. Further, an electronic member necessary for the operation of the communication device 1-1 such as a power IC may be further arranged on the circuit board 7. The electronic members are driven by the electric power supplied from the electric storage device 5. Note that the electronic members may be supplied with the electric power from an external power supply or a primary battery. The primary battery can be, for example, a button battery or a dry battery and may be accommodated in the housing 2. When the primary battery is used as a power supply source, it is possible to reduce the frequency of charging and discharging associated with the use of the electric storage device 5. Thus, it is possible to suppress the speed of the performance deterioration of the electric storage device 5.

Note that, in the present embodiment, the circuit board 7 includes a single substrate, but the present technology is not limited to this example. For example, the circuit board 7 may include a plurality of substrates. More specifically, the circuit board 7 may separately include a control board on which the microcontroller 73 and a control member such as an IC chip used for near field communications such as Felica or BLE are mounted and a user interface (UI) board on which input/output members having an input/output function such as the input receiving unit 71 and the display member 72 are mounted. In this configuration, for the UI board, it is necessary to change the arrangement of the input/output members in accordance with a change in the shape of the housing, but for the control board, it is possible to generalize the arrangement of the control members regardless of the shape of the housing. Therefore, in a case in which housings with various shapes are manufactured, it is possible to use the control board in which the arrangement of the control members is generalized. Accordingly, it is possible to reduce the manufacturing cost of the housing. Note that the control board and the UI board may be arranged in the housing so that the surfaces of the boards are substantially on the same plane. Accordingly, a plurality of substrates can be arranged in the housing without increasing the thickness of the housing.

The input receiving unit 71 receives an input from the button 21 installed in the housing 2. The input receiving unit 71 may be, for example, a switch or the like. Input receiving units 71a to 71c are installed at positions corresponding to the respective buttons 21a to 21c. For example, if the button 21 is pushed by the user, the input receiving unit 71 is mechanically pushed toward the circuit board 7 side by the button 21. Then, the input receiving unit 71 mechanically connects a plurality of contact points which are spaced apart from one another in the electronic circuit. Accordingly, the microcontroller 73 described below recognizes the input operation performed by the user. Note that, in the present embodiment, the button 21 and the input receiving unit 71 are separated from each other, but the button 21 and the input receiving unit 71 may be integrally formed. Further, the number of the input receiving units 71 to be installed is not particularly limited, and the number of the input receiving units 71 to be installed may be decided in accordance with the number of the buttons 21 to be installed.

Note that, in the present embodiment, the button 21 is used as the input member, but the type of input member is not particularly limited. For example, the button 21 may be a touch sensor or the like. However, it is preferable that the input member is a mechanism in which the input receiving unit 71 receives an input when a pushing operation or a pulling operation is performed by a finger of the user as in a push button or a switch. In this case, since the input receiving unit 71 can perform an operation of opening or closing the contact points of the electronic circuit through a mechanical operation, the electric power is not consumed even when the input operation is received. Accordingly, it is possible to reduce the power consumption of the communication device 1-1. Further, since the input operation is performed by performing an operation of pushing or pulling the button 21, the user is able to understand the input operation according to a change in a tactile sense.

The display member 72 forms a display for the user through the display window 22 installed in the housing 2 by light emission or extinction in accordance with a control of the microcontroller 73 to be described later. Display members 72a to 72d are installed at positions corresponding to the respective display windows 22a to 22d. The display member 72 may be, for example, a light emitting diode (LED). When the LED is used, it is possible to reduce the energy consumption of the communication device 1-1. Further, the LED used as the display member 72 may emit light of a single color or emit light of a plurality of colors. When the LED emits light of a plurality of colors, it is possible to express various functions of the communication device 1-1.

Further, in a case in which a plurality of LEDs are installed, the respective LEDs may emit light of the same color or may emit light of different colors. By preparing a plurality of color light patterns of the LED, it is possible to express the various functions of the communication device 1-1 more finely. For example, in a case in which the communication device 1-1 is able to use four types of electronic moneys, when only the display member 72a emits light of one color, and the display members 72b to 72d emit light of other colors, it is possible to display that the electronic money corresponding to the display member 72a has been selected among the four types of electronic moneys described above. Further, it is possible to display the remaining electric power of the electric storage device 5, the remaining amount of the electronic money, the communication state of the communication device 1-1, and the like in accordance with the colors of light emitted by the display members 72a to 72d. Further, the display member 72 can also be blinked in accordance with the control of the microcontroller 73. In this case, for example, by adjusting a blinking interval of the display member 72, it is possible to present the functions of the communication device 1-1 to the user by more various methods.

Note that the type of display member 72 may be selected in accordance with the power generation amount of the solar cell 4, the power storage amount of the electric storage device 5, and the power consumption of the display member 72. For example, in a case in which the power generation amount or the power storage amount is increased with the increase in the size of the communication device 1-1, for example, other display devices such as a liquid crystal display (LCD) having the higher power consumption than the LED may be used as the display member 72. Further, in the present embodiment, the display window 22 and the display member 72 are separated from each other, but the display window 22 and the display member 72 may be integrally formed. Further, the number of display members 72 to be installed is not particularly limited but may be decided in accordance with the number of display windows 22 to be installed.

The microcontroller 73 controls some or all of the electronic members, the IC chip, and the like arranged in the electronic circuit on the circuit board 7. For example, the microcontroller 73 may perform control of changing the display form on the display member 72 in accordance with the input operation received by the input receiving unit 71 or may perform control of selecting a type of electronic money to be used, or the like on an IC chip.

The IC chip is a chip that stores necessary information in an authentication process and an electronic money settlement process. Further, the antenna is an antenna which is used to perform communication for information stored in the IC chip with the information communication terminal or the contactless reader/writer described above. In the present embodiment, the IC chip and the antenna are arranged on the circuit board 7 as a pair of combinations. However, the antenna need not necessarily be installed on the circuit board 7. For example, the antenna may be installed along the inside of the housing 2. Further, a plurality of different IC chips and a plurality of antennas may be installed on the circuit board 7. For example, an IC chip and an antenna supporting Felica and an IC chip and an antenna supporting BLE may be each installed on the circuit board 7. Note that the IC chip may be integrated with the microcontroller 73.

In the present embodiment, in the communication device 1-1, the circuit board 7 on which the antenna is installed is installed to face the inner surface of the housing 2. Therefore, the antenna is able to perform communication with the external communication device described above when the surface of the housing 2 facing the circuit board 7 is brought close to the external communication device as the upper surface.

[2-2. Arrangement of Components]

The respective constituent members accommodated in the housing 2 are arranged in the order of the solar cell 4, the electric storage device 5, the magnetic sheet 6, and the circuit board 7 in a Z-axis direction as illustrated in FIG. 4. First, the solar cell 4 is arranged such that the light receiving surface faces the opening portion OP of the housing 2b. Further, on the circuit board 7, the surface having the electronic circuit faces the inner surface of the housing 2a.

Figure 5:
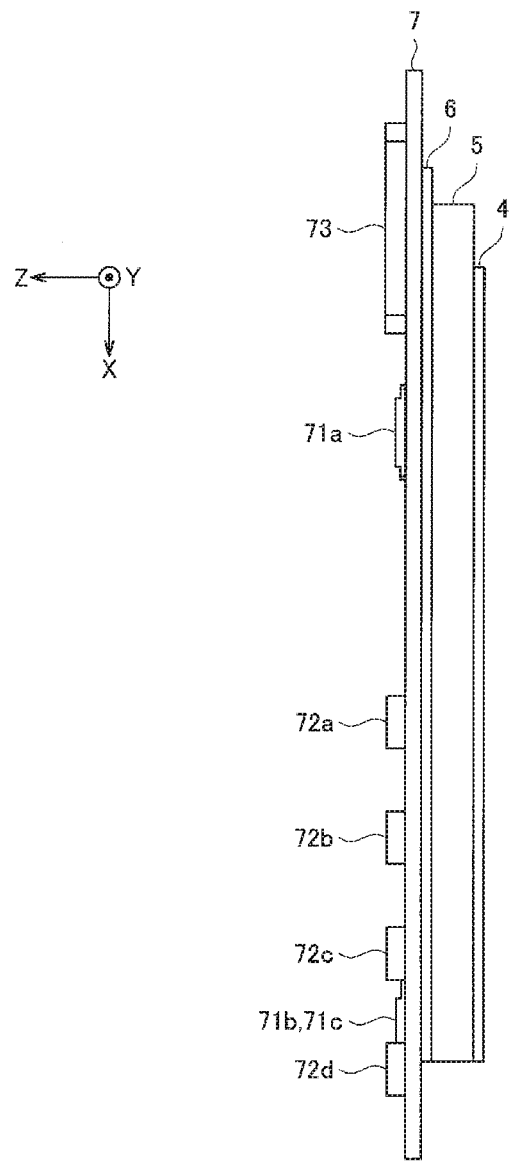
FIG. 5 is a side view illustrating an internal configuration example of the communication device housing according to the first embodiment of the present disclosure.

FIG. 5 is a side view illustrating an internal configuration example of the housing 2 of the communication device 1-1 according to the first embodiment of the present disclosure. Referring to FIG. 5, the magnetic sheet 6 is arranged on the back surface of the surface having the input receiving unit 71, the display member 72, and the microcontroller 73 in the circuit board 7. In the Z-axis direction, the electric storage device 5 and the magnetic sheet 6 are brought into contact with each other on the back surface of the opposite surface of the electric storage device 5 to the solar cell 4. The magnetic sheet 6 is formed between the circuit board 7 and the electric storage device 5 in order to shield the radio wave generated from the circuit board 7. Further, the solar cell 4 and the electric storage device 5 are brought into contact with each other on the back surface of the light receiving surface of the solar cell 4. In other words, in the housing 2 of the communication device 1-1, the respective constituent members are arranged such that the surface having the input receiving unit 71 or the like of the circuit board 7 and the light receiving surface of the solar cell 4 are faced to the inner surface of the housing 2, and the magnetic sheet 6 is interposed between the circuit board 7 and the electric storage device 5.

The following operations and effects can be achieved through the arrangement of the respective constituent members according to the present embodiment illustrated in FIG. 5. First, according to the arrangement of the solar cell 4 according to the present embodiment, since the solar cell 4 is installed on the back surface of the electric storage device 5, the solar cell 4 does not interfere with other constituent members or electronic members even though the size of the solar cell 4 is increased. In other words, it is possible to freely adjust the area of the light receiving surface of the solar cell 4 in the internal space of the housing 2 without considering the interference with other constituent members or electronic members on the back surface of the electric storage device 5. Therefore, the area of the light receiving surface of the solar cell 4 can be maximized even in the limited space inside the housing 2. Accordingly, it is possible to increase the power generation amount of the solar cell 4.

Further, in the arrangement of the circuit board 7, since electronic members such as the input receiving unit 71, the display member 72, and the microcontroller 73 are arranged on the opposite surface facing the housing 2a, it is possible to arrange the solar cell 4, the electric storage device 5, and the magnetic sheet 6, and the circuit board 7 to be in close contact with one another as illustrated in FIG. 5. In a case in which an electronic member other than the antenna is arranged on the back surface of the opposite surface of the circuit board 7 facing the housing 2a, it is necessary to arrange the magnetic sheet 6, the electric storage device 5, and the solar cell 4 not to interfere with the electronic member described above. In this case, for example, by reducing the size of the solar cell 4 so that it does not interfere with the electronic member described above, the power generation amount may be reduced. Further, since the area of the magnetic sheet 6 is small, the noise generated by the antenna may be likely to occur. Further, in a case in which the size of the solar cell 4 or the magnetic sheet 6 is secured, it is necessary to increase the size of circuit board 7 in order to prevent interference between the electronic member and other constituent members. In this case, it is necessary for the size of the housing 2 to be increased in accordance with the size of the circuit board 7, and the convenience of the user is reduced. For this reason, it is preferable that no electronic members other than the antenna be arranged on the back surface of the above-described opposite surface of the circuit board 7. Further, when the input receiving unit 71 is installed on the opposite surface of the circuit board 7 to the housing 2a, it is not necessary to consider the interference between the button 21 installed in the housing 2 and the solar cell 4, the electric storage device 5, and the magnetic sheet 6. As described above, by optimizing the arrangement of the respective constituent members in the housing 2 as described above, it is possible to keep the minimum thickness of the interior of the housing 2 while maximizing the electric energy of the solar cell 4. Accordingly, it is possible to increase the use frequency of the communication device 1-1 while reducing the size of the communication device 1-1. As a result, the convenience of the user using the communication device 1-1 is improved.

[2-3. Modified Example of Configuration]

The configuration example of the communication device 1-1 according to the first embodiment of the present disclosure has been described above. Note that the internal configuration and the external configuration of the communication device 1-1 according to the present embodiment are not limited to this example. A modified example of the internal configuration and the external configuration of the communication device 1-1 according to the present embodiment will be described below.

(Modified Example of Internal Configuration)

FIGS. 6A, 6B, 6C, 6D, 6E, and 6F are diagrams illustrating a modified example of the internal configuration of the communication device 1-1 according to the first embodiment of the present disclosure. As illustrated in FIGS. 6A, 6B, 6C, 6D, 6E, and 6F, the respective constituent members of the solar cell 4, the electric storage device 5, the magnetic sheet 6, the circuit board 7, and the antenna 74 are arranged in the housing 2 in various orders in the Z-axis direction. Here, a surface facing a direction opposite to the Z axis in FIGS. 6A, 6B, 6C, 6D, 6E, and 6F is referred to as a "first surface," and a surface facing the Z-axis direction is referred to as a "second surface." The first surface is the surface having the opening portion OP of the housing 2. Further, in each of examples illustrated in FIGS. 6A, 6B, 6C, 6D, 6E, and 6F, the configuration of the housing 2 is omitted.

Figure 6:
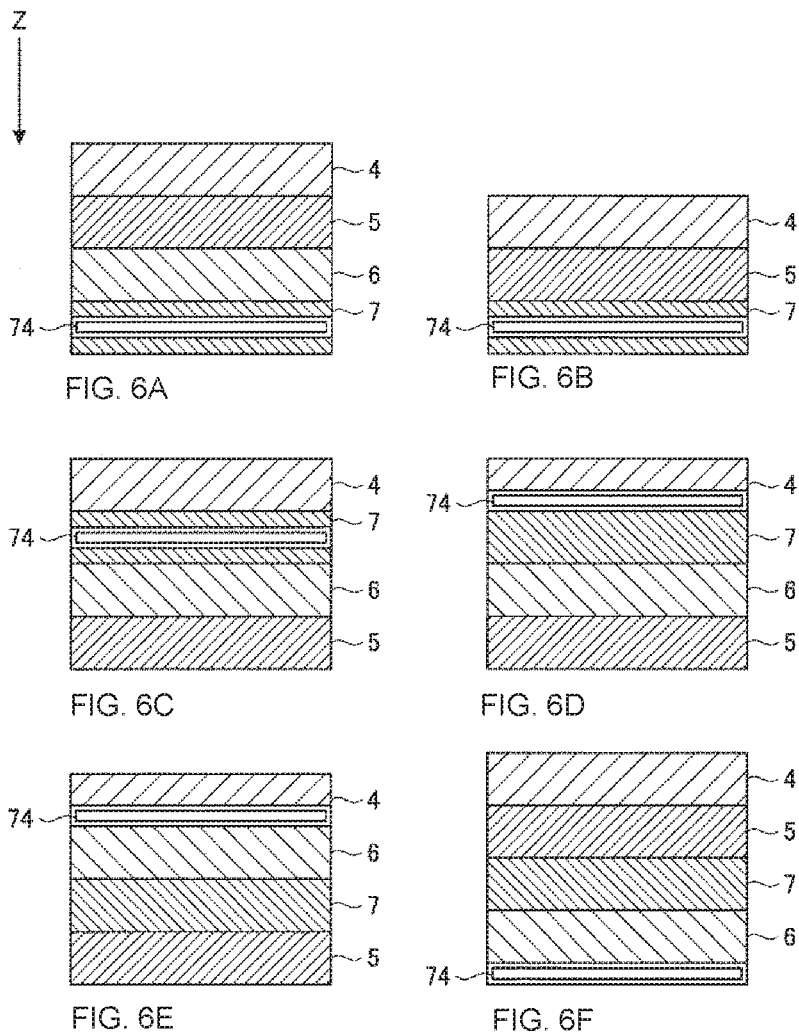
FIGS. 6A, 6B, 6C, 6D, 6E, and 6F are diagrams illustrating a modified example of an internal configuration of the communication device according to the first embodiment of the present disclosure.

First, in an example illustrated in FIG. 6A, as described regarding the internal configuration of the communication device 1-1 according to the present embodiment, the respective constituent members are arranged in the order of the solar cell 4, the electric storage device 5, the magnetic sheet 6, and the circuit board 7 in the Z-axis direction. An antenna 74 may be installed on the surface of the circuit board 7 or in the circuit board 7.

Next, in an example illustrated in FIG. 6B, unlike the example illustrated in FIG. 6A, the respective constituent members are arranged in the order of the solar cell 4, the electric storage device 5, and the circuit board 7 in the Z-axis direction. The antenna 74 may be provided on the surface of the circuit board 7 or in the circuit board 7. The configuration illustrated in FIG. 6B does not include the magnetic sheet 6. Accordingly, it is possible to reduce the thickness of the housing 2 even though there is a possibility that the communication quality will be lowered.

In an example illustrated in FIG. 6C, the respective constituent members are arranged in the order of the solar cell 4, the circuit board 7, the magnetic sheet 6, and the electric storage device 5 in the Z-axis direction. The antenna 74 may be installed on the surface of the circuit board 7 or in the circuit board 7. In this configuration, the antenna 74 carries out communication using a radio wave in the direction in which the solar cell 4 is arranged. In other words, when the first surface of the housing 2 on the side on which the solar cell 4 is arranged is brought close to the external communication device as the upper surface, the communication device 1-1 is able to perform communication with the external communication device.

In an example illustrated in FIG. 6D, the respective constituent members are arranged in the order of the solar cell 4, the circuit board 7, the magnetic sheet 6, and the electric storage device 5 in the Z-axis direction. The antenna 74 is installed around the solar cell 4. In this configuration, the antenna 74 performs communication using a radio wave in a direction opposite to the Z axis in FIGS. 6A, 6B, 6C, 6D, 6E, and 6F. In other words, when the first surface of the housing 2 is brought close to the external communication device as the upper surface, the communication device 1-1 can perform communication with the external communication device. Further, the antenna 74 is arranged close to the first surface of the housing 2. Thus, the communication sensitivity of the antenna 74 can be increased. Further, since it is not necessary to install the antenna on the circuit board 7, the size of the circuit board 7 can be reduced. Thus, the size of the housing 2 can be further reduced. Note that the antenna 74 may be arranged around the circuit board 7.

In an example illustrated in FIG. 6E, the respective constituent members are arranged in order of the solar cell 4, the magnetic sheet 6, the circuit board 7, and the electric storage device 5 in the Z-axis direction. The antenna 74 is installed around the solar cell 4. In this configuration, the antenna 74 performs communication using a radio wave in a direction opposite to the Z axis in FIGS. 6A, 6B, 6C, 6D, 6E, and 6F. In other words, when the first surface of the housing 2 is brought close to the external communication device as the upper surface, the communication device 1-1 can perform communication with the external communication device. Further, the antenna 74 is arranged close to the first surface of the housing 2 of the housing 2. Thus, the communication sensitivity of the antenna 74 can be increased. Further, since it is not necessary to install the antenna on the circuit board 7, the size of the circuit board 7 can be reduced. Thus, the size of the housing 2 can be further reduced.

In an example illustrated in FIG. 6F, the respective constituent members are arranged in the order of the solar cell 4, the electric storage device 5, the circuit board 7, and the magnetic sheet 6 in the Z-axis direction. The antenna 74 is arranged on the back surface of the opposite surface of the magnetic sheet 6 to the circuit board 7. In this configuration, the antenna 74 performs communication using the radio wave in the Z-axis direction illustrated in FIGS. 6A, 6B, 6C, 6D, 6E, and 6F. In other words, when the second surface of the housing 2 is brought close to the external communication device as the upper surface, the communication device 1-1 can perform communication with the external communication device. Further, the antenna 74 is arranged close to the second surface of the housing 2. Thus, the communication sensitivity of the antenna 74 can be increased.

The modified examples of the internal configuration of the communication device 1-1 according to the first embodiment of the present disclosure have been described above. Note that the modified examples of the internal configuration of the communication device 1-1 according to the present embodiment are not limited to the configuration and the arrangement order illustrated in FIGS. 6A, 6B, 6C, 6D, 6E, and 6F. For example, as long as the solar cell 4, the electric storage device 5, the magnetic sheet 6, and the circuit board 7 are arranged in a layer form, since a total thickness of the respective constituent members is constant, the order thereof can be appropriately changed in accordance with other causes (for example, communication performance, physical or electromagnetic interference caused by the electronic member, or the like). Further, the position of the antenna 74 is not particularly limited as long as the communication performance is secured, and for example, the antenna 74 may be arranged on the surface of the magnetic sheet 6, the surface of the circuit board 7 or in the circuit board 7, around the solar cell 4, the inner surface of the housing 2, or the like. Further, a plurality of antennas may be installed in the housing 2. Further, the presence or absence of the magnetic sheet 6, an area and a thickness of the magnetic sheet 6, and the like can be appropriately changed depending on the communication quality.

(First Modified Example of External Configuration)

Figure 7:
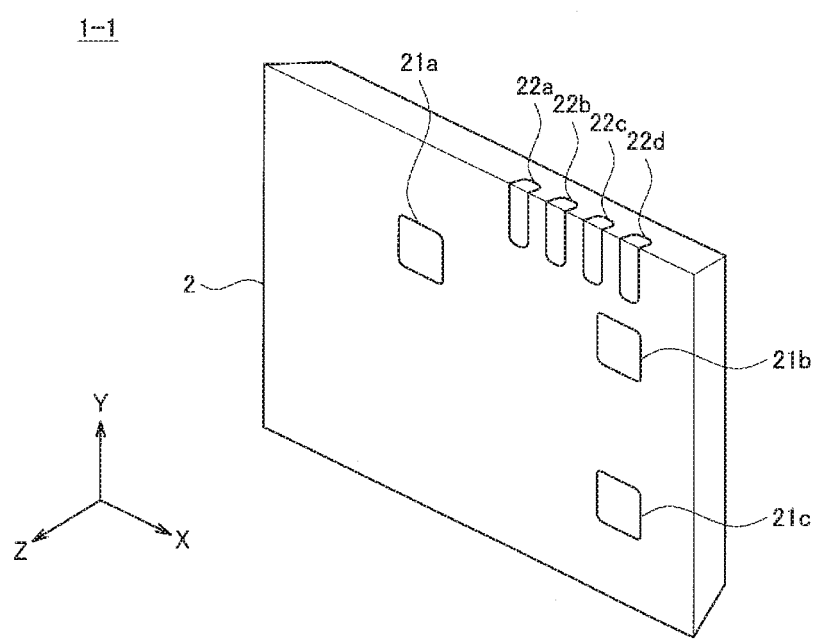
FIG. 7 is a diagram illustrating a first modified example of an external configuration of a communication device according to the first embodiment of the present disclosure.

Next, a modified example of the external configuration of the communication device 1-1 according to the first embodiment of the present disclosure will be described. FIG. 7 is a diagram illustrating a first modified example of the external configuration of the communication device 1-1 according to the first embodiment of the present disclosure. Referring to FIG. 7, the communication device 1-1 includes a housing 2. The housing 2 includes buttons 21a to 21c and display windows 22a to 22d. The functions or the like of the respective constituent members are the same as those of the respective constituent members of the present embodiment, and thus description thereof is omitted.

As illustrated in FIG. 7, the housing 2 of the present modified example has a substantially truncated square cone shape. The shape of the housing 2 may be a substantially rectangular parallelepiped shape. In this configuration, a constituent member having a rectangular shape such as the solar cell 4 can be arranged in the housing 2 with no gap. Thus, an internal volume of the housing 2 can be reduced, and the compact housing 2 can be implemented.

(Second Modified Example of External Configuration)

Figure 8:
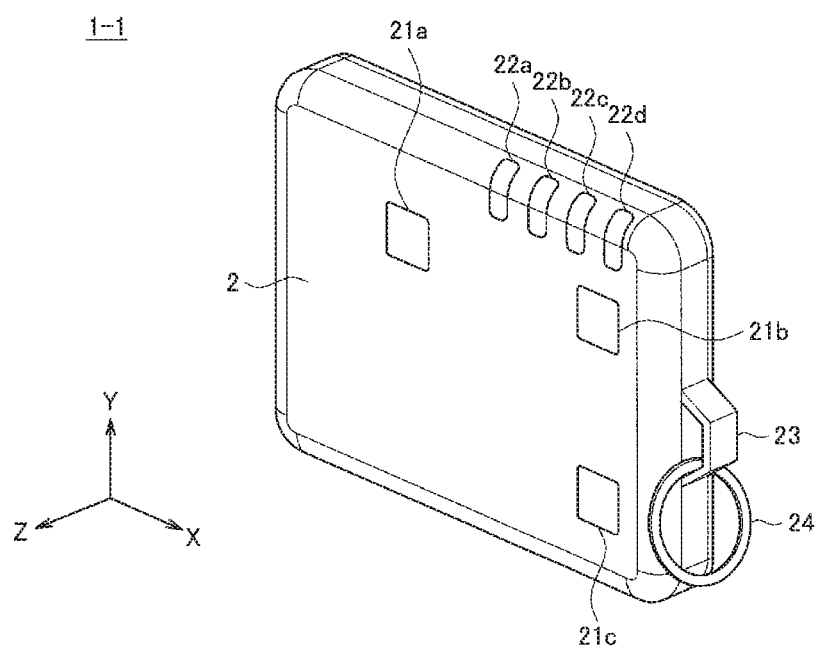
FIG. 8 is a diagram illustrating a second modified example of an external configuration of a communication device according to the first embodiment of the present disclosure.

FIG. 8 is a diagram illustrating a second modified example of the external configuration of the communication device 1-1 according to the first embodiment of the present disclosure. Referring to FIG. 8, the communication device 1-1 includes a housing 2. Moreover, the housing 2 further includes a ring loop 23 and a ring 24 in addition to the buttons 21a to 21c and the display windows 22a to 22d. The functions or the like of the respective constituent members other than the ring loop 23 and the ring 24 are the same as those of the respective constituent members of the present embodiment, and thus description thereof is omitted.

As illustrated in FIG. 8, the ring loop 23 is provided on one side surface of the housing 2 so that a space is formed between the ring loop 23 and the side surface of the housing 2. The ring loop 23 may be provided integrally with the housing 2 or may be provided such that both ends of the ring loop 23 are fixed to the side surface of the housing 2. The ring 24 passes through the space formed between the ring loop 23 and the side surface of the housing 2 and is hooked onto the ring loop 23. In this configuration, the ring 24 can be hung to a daily necessity or the like such as a bag or a wallet. Thus, the communication device 1-1 can be carried more easily.

(Third Modified Example of External Configuration)

Figure 9:
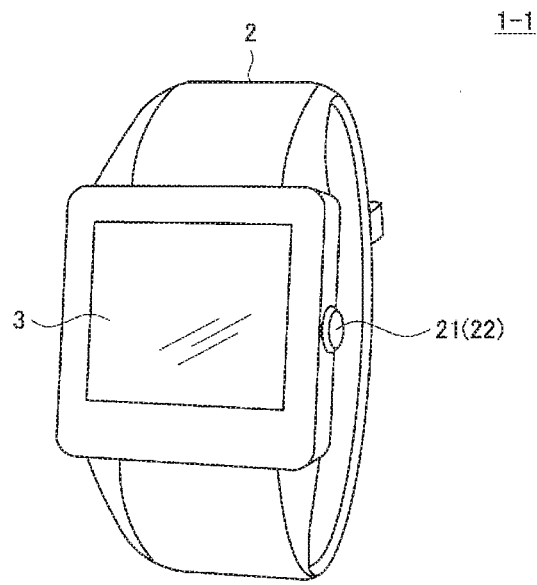
FIG. 9 is a diagram illustrating a third modified example of an external configuration of a communication device according to the first embodiment of the present disclosure.

FIG. 9 is a diagram illustrating a third modified example of the external configuration of the communication device 1-1 according to the first embodiment of the present disclosure. Referring to FIG. 9, the communication device 1-1 includes a wristwatch type housing 2. The housing 2 includes a protection member 3 for protecting the opening portion OP, and a button 21 (display window 22). The button 21 and the display window 22 are formed integrally. The functions or the like of the respective constituent members are the same as those of the respective constituent members of the present embodiment, and thus description thereof is omitted.

The wristwatch type housing 2 according to the present modified example illustrated in FIG. 9 is mounted on the user's arm or the like. Thus, the user can easily carry the communication device 1-1. For example, the solar cell 4 and the antenna may be arranged below the protection member 3. With this configuration, the light receiving surface of the solar cell 4 can be arranged at a corresponding position of the opening portion OP, and a communication direction of the antenna can be defined as a direction in which the protection member 3 is passed through. Accordingly, charging can be performed by external light when the user is wearing the housing 2, and communication with the external communication device can be performed by bringing the surface of the protection member 3 close to the external communication device as the upper surface.

The modified examples of the external configuration of the communication device 1-1 according to the first embodiment of the present disclosure have been described above. Note that the modified examples of the external configuration of the communication device 1-1 according to the present embodiment are not limited to the configurations illustrated in FIGS. 7 to 9. For example, as long as the respective constituent members such as the solar cell 4 are arranged in the housing 2 in the order illustrated in FIGS. 6A, 6B, 6C, 6D, 6E, and 6F, the external configuration of the housing 2 is not limited at all. Further, the arrangement position of the solar cell 4, the antenna, or the like can be changed appropriately depending on the external configuration of the housing 2 as long as the charging performance and the communication performance are ensured. For example, in the modified example illustrated in FIG. 9, when the solar cell 4 and the antenna are arranged below the protection member 3, the charging performance and the communication performance can be secured.

<3. Second Embodiment>

Figure 10:
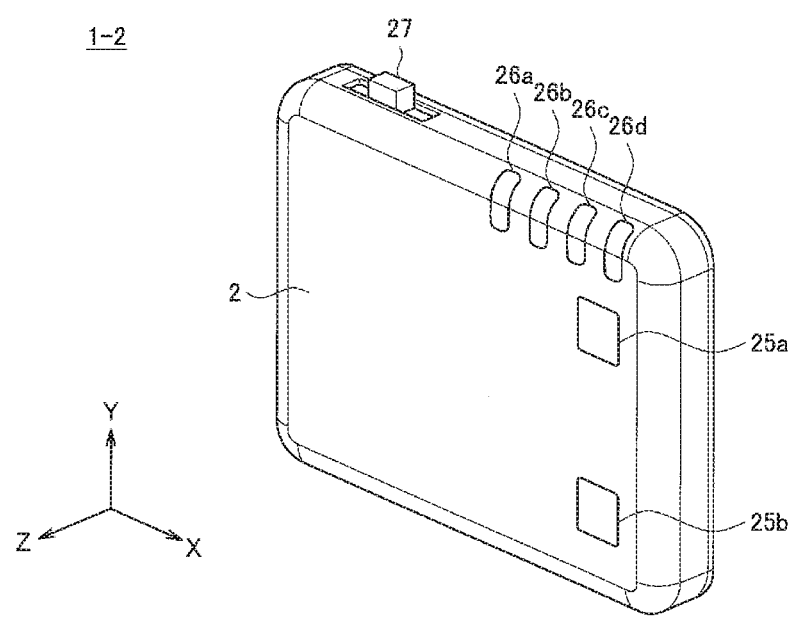
FIG. 10 is a diagram illustrating a configuration example of a communication device according to a second embodiment of the present disclosure.

FIG. 10 is a diagram illustrating a configuration example of a communication device 1-2 according to a second embodiment of the present disclosure. Referring to FIG. 10, the communication device 1-2 according to the second embodiment of the present disclosure has buttons 25a to 25b and display windows 26a to 26d in a housing 2. Further, the communication device 1-2 according to the second embodiment of the present disclosure has a slide switch 27, unlike the communication device 1-1 according to the first embodiment. The button 25 and the display window 26 of the present embodiment are identical to the button 21 and the display window 22 of the first embodiment, and each internal configuration of the housing 2 is the same as the internal configuration of the housing 2 according to the first embodiment, and thus description thereof is omitted.

The slide switch 27 is an example of an input member, and in an example illustrated in FIG. 10, the slide switch 27 is provided on an outer side of the housing 2. The slide switch 27 may be provided at any position in the housing 2. For example, the slide switch 27 may be arranged on the side surface of the housing 2 as illustrated in FIG. 10. When the user performs an operation of adjusting a knob position of the slide switch 27, the communication device 1-2 is able to perform a predetermined processing operation. For example, the microcontroller 73 may select the type of electronic money to be used by the user, depending on the knob position of the slide switch 27. In this case, the position of the slide switch 27 will indicate the type of electronic money to be used. Accordingly, since it is not necessary to display the type of electronic money used through the display window 26, it is possible to suppress the consumption of the electric power by the displaying of the display window 26. Further, it is possible to perform an operation of switching various other functions which can be implemented by the communication device 1-2 through the slide switch 27.

<4. Third Embodiment>

Figure 11:
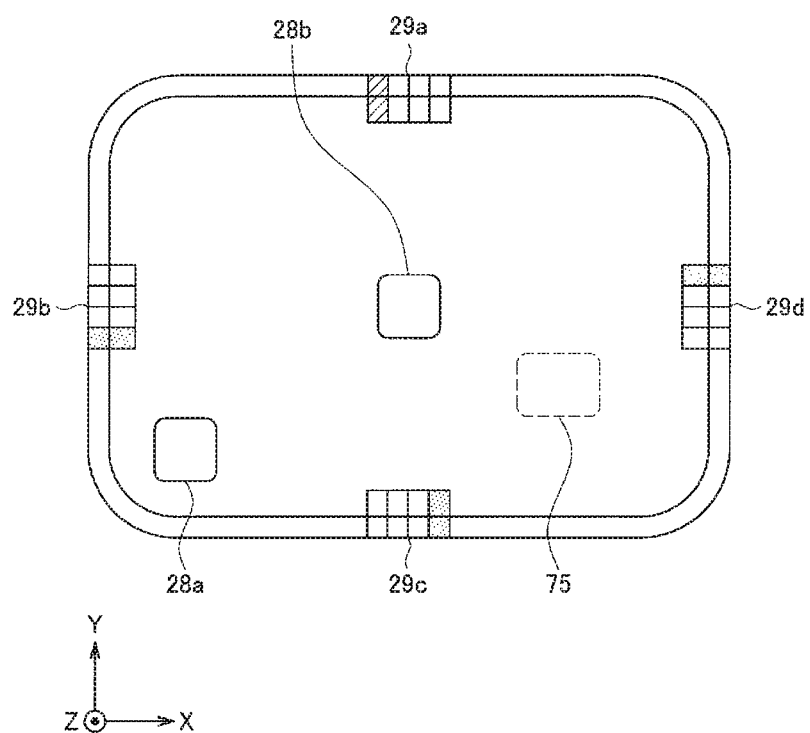
FIG. 11 is a diagram illustrating a configuration example of a communication device according to a third embodiment of the present disclosure.

FIG. 11 is a diagram illustrating a configuration example of a communication device 1-3 according to a third embodiment of the present disclosure. Referring to FIG. 11, the communication device 1-3 according to the third embodiment of the present disclosure has buttons 28a to 28b and display windows 29a to 29d in a housing 2. Further, the communication device 1-3 according to the third embodiment of the present disclosure differs from the communication device 1-1 according to the first embodiment and includes an acceleration sensor 75 inside the housing 2. The button 28 and the display window 29 of the present embodiment are identical to the button 21 and the display window 22 of the first embodiment, and the respective constituent members other than the acceleration sensor 75 present in the housing 2 are identical to the respective constituent members of the first embodiment, and thus description thereof is omitted.

The acceleration sensor 75 is an example of a sensor for measuring the acceleration of the communication device 1-3 and detecting the attitude of the communication device 1-3. For example, the acceleration sensor 75 may be a gyro sensor or the like using a piezo resistive effect or the like by a piezo element. The acceleration sensor 75 may be provided on an electronic circuit of the circuit board 7. For example, if the acceleration sensor 75 detects an attitude of the communication device 1-3, the microcontroller 73 may perform control of changing the display form of the display member 72, control of changing a type of electronic money to be used, or the like in accordance with the detected attitude.

In FIG. 11, a Y-axis direction in FIG. 11 is defined as a vertically upward direction. In this case, the acceleration sensor 75 first detects the attitude of the communication device 1-3. The microcontroller 73 selects the electronic money to be used in accordance with the detected attitude. For example, the microcontroller 73 may select electronic money corresponding to the attitude or the direction of the communication device 1-3. For example, the microcontroller 73 may associate available electronic money with the display window 29 of changing the display form, depending on the attitude detected by the acceleration sensor 75. Accordingly, for example, the user is able to understand that the electronic money corresponding to the display window 29 in which the display form has changed is selected by recognizing that the display form of the display window 29 at the highest position in the display window 29 has changed. In the example illustrated in FIG. 7, a part of the display window 29a indicates a color different from the colors of some of the other display windows 29b to 29d. This indicates that the communication device 1-3 is ready to use the electronic money corresponding to the display window 29a.

Figure 12:
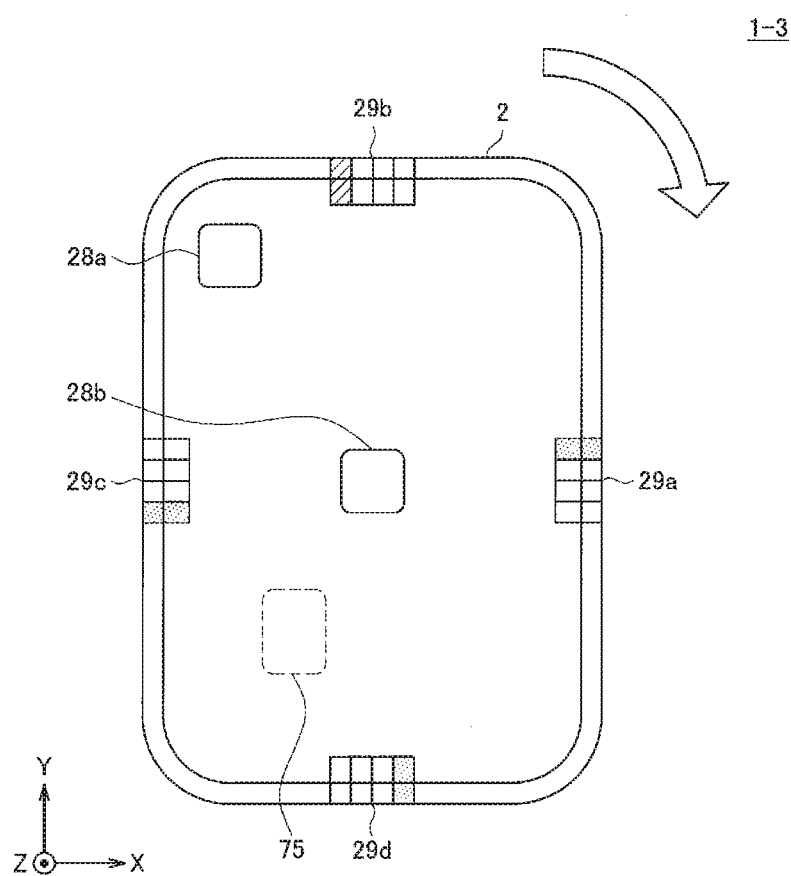
FIG. 12 is a diagram illustrating a state of the communication device according to the third embodiment of the present disclosure illustrated in FIG. 11 after the communication device is rotated.

FIG. 12 is a diagram illustrating a state of the communication device 1-3 after the communication device 1-3 according to the third embodiment of the present disclosure illustrated in FIG. 11 is rotated. The communication device 1-3 illustrated in FIG. 12 is a state after the communication device 1-3 illustrated in FIG. 11 is rotated clockwise 90° toward a paper plane. In this case, a part of the display window 29b indicates a different color from a part of each of the other display windows 29a, 29c, and 29d. This indicates that the communication device 1-3 is ready to use the electronic money corresponding to the display window 29b. Thus, the communication device 1-3 is able to switch the electronic money to be used in accordance with the attitude of the communication device 1-3 detected by the acceleration sensor 75. Accordingly, the user is able to select the electronic money to be used just by changing the direction of the communication device 1-3, and thus the convenience of the user is improved. Further, by changing the direction of the communication device 1-3, it is possible to switch not only the functions related to the electronic money but also various other functions which can be implemented by the communication device 1-3.

Note that, in the example illustrated in FIG. 11 and FIG. 12, each of the display windows 29a to 29d has a divisional display window divided into four, and display is performed in one of the divisional display windows displayed by light emission, but the present technology is not limited to this example. For example, each of the display windows 29a-29d may have one display window or a plurality of divided display windows. The number of divisions of the display window may be set in accordance with the electric power used by the display member in the communication device 1-3. Further, in a case in which the electronic money is selected in accordance with the attitude of the communication device 1-3, the display window corresponding to the unselected electronic money may not be displayed by the display member. Accordingly, it is possible to further reduce the consumption of the electric power in the communication device 1-3.

<5. Fourth Embodiment>

[5-1. Configuration and Arrangement of Communication Device]

Figure 13:
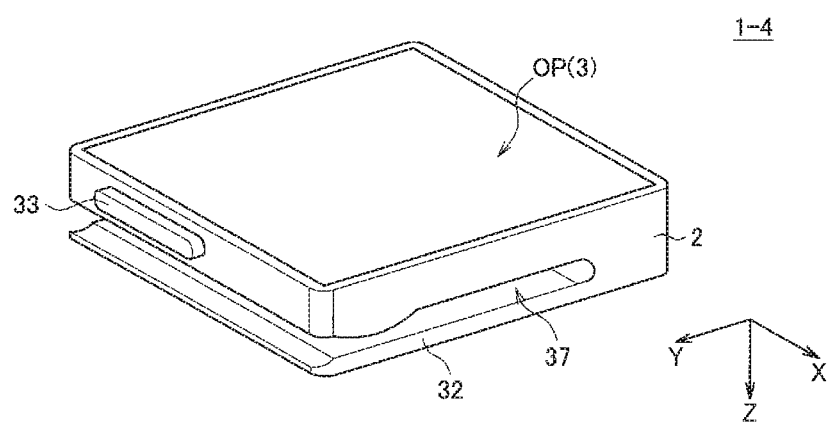
FIG. 13 is a diagram illustrating an external configuration example of a communication device according to a fourth embodiment of the present disclosure.
Figure 14:
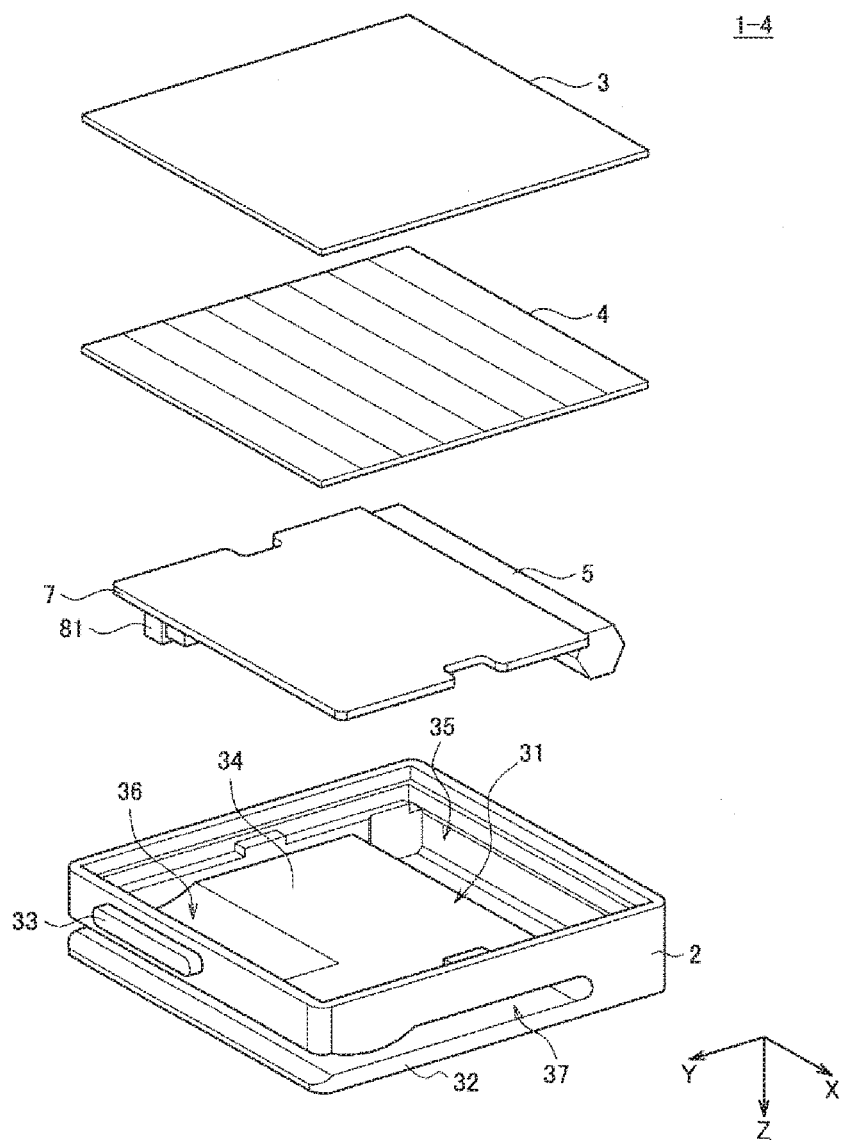
FIG. 14 is a diagram illustrating an internal configuration example of the communication device according to the fourth embodiment of the present disclosure.

FIGS. 13 and 14 are diagrams illustrating an external configuration example and an internal configuration example of a communication device 1-4 according to a fourth embodiment of the present disclosure. Referring to FIGS. 13 and 14, the communication device 1-4 according to the fourth embodiment of the present disclosure has a clip-type housing 2. A material for forming the housing 2 is identical to that of the housing 2 according to the first embodiment of the present disclosure.

The clip-type housing 2 includes an accommodating portion 31 formed by a bottom surface facing the opening portion OP and a side surface extending from an edge portion of the bottom surface in the direction in which the opening portion OP is present and an extended member 32 which is partially connected with the accommodating portion 31 and arranged to face the bottom surface of the accommodating portion 31 with a predetermined gap 37 in between. The accommodating portion 31 accommodates each member such as the solar cell 4. Further, the accommodating portion 31 includes a button 33 installed on a side surface thereof.

At least a part of a bottom surface 34 in the accommodating portion 31 is recessed outwardly from the inner side of the housing 2. This dent may accommodate at least one member. For example, a groove portion 35 in which an electric storage device is accommodated may be formed on a connecting portion side of the accommodating portion 31 and the extended member 32. Further, a dent 36 in which an electronic member on the substrate is accommodated may be formed around the button 33 installed on the side surface of the accommodating portion 31.

(Clip Structure of Housing)

In the present embodiment, a clip function is implemented by the bottom surface of the accommodating portion 31 and the extended member 32. For example, a pinched object such as a breast pocket of a shirt or a wallet is inserted in the gap 37, and the communication device 1-4 is locked to the pinched object described above. Note that a shape, a position, a width, and a depth of the gap 37 are not particularly limited. In the example illustrated in FIGS. 13 and 14, in order to more effectively implement the function of the clip including the bottom surface of the accommodating portion 31 and the extended member 32, a width of the gap 37 (an interval between the bottom surface of the accommodating portion 31 and the extended member 32) has a shape changing along the Y-axis direction. For example, as illustrated in FIGS. 13 and 14, the width of the gap 37 decreases as a protrusion is formed on the bottom surface of the accommodating portion 31 near the opening of the gap 37 in a direction of the extended member 32. With this configuration, the communication device 1-4 pinches the pinched object more firmly. Therefore, the communication device 1-4 is hardly dropped from the pinched object such as the breast pocket. Accordingly, it is easier to carry the communication device 1-4 in a state in which it is hooked to the pinched object.

(Button)

The button 33 is a member having the same function as the button 21 in the first embodiment of the present disclosure. In other words, the button 33 is an example of an input member of the communication device 1-4. Each function of the button 33 is the same as that of the button 21, and thus description thereof is omitted. Further, the button 33 may perform the same function as the display window 22 in the first embodiment of the present disclosure. For example, the button 33 may be formed of a transparent or translucent material, or the like, and a display member may be arranged at a position corresponding to the button 33 on the circuit board 7. Accordingly, it is possible for the user to visually recognize the display state of the display member arranged on the circuit board 7 through the button 33. Note that the number of buttons 33 to be installed and an installation position of the buttons 33 are not particularly limited. Further, the button 33 may separately include a button having a function of an input member and a display window having a function of a member indicating the display state.

(Groove Portion)

The groove portion 35 is a groove formed in a portion of the bottom surface 34 in the accommodating portion 31. The electric storage device 5 is accommodated in the groove portion 35. Note that a depth and a shape of the groove portion 35 can be appropriately changed depending on the size of the electric storage device 5 in a radial direction, a size of the electric storage device 5 in a longitudinal direction, and a shape of the electric storage device 5. For example, in a case in which the electric storage device 5 is a button shape, the shape of the groove portion 35 may be a dish shape capable of accommodating the button shaped electric storage device 5.

FIG. 14 is a diagram illustrating the internal configuration example of the communication device 1-4 according to the fourth embodiment of the present disclosure. Referring to FIG. 14, the communication device 1-4 accommodates the solar cell 4, the electric storage device 5, the circuit board 7, and the antenna in the space closed by the housing 2 and the protection member 3. Note that the opening portion OP of the housing 2 is covered by the protection member 3. The protection member 3 and the solar cell 4 of the present embodiment are identical to the respective constituent members of the first embodiment of the present disclosure, and thus description thereof is omitted.

The electric storage device 5 is a battery that stores electric power including electric power generated by the solar cell 4. A type of electric storage device 5 is not particularly limited. The electric storage device 5 may be, for example, a battery described in the first embodiment of the present disclosure, a capacitor, or the like. In the example illustrated in FIG. 14, the electric storage device 5 has a prism shape having a bottom surface of a hexagonal shape, but the shape of the electric storage device 5 is not particularly limited. For example, the electric storage device 5 may have an arbitrary cylindrical shape, and the shape of the bottom surface constituting the cylindrical shape may be a circle or a polygon such as a rectangle or a pentagon. Further, the electric storage device 5 may be a button shape. The electric storage device 5 is accommodated in the groove portion 35 of the housing 2. The electric power stored in the electric storage device 5 can be consumed to drive the respective members arranged on the circuit board 7 to be described later. Note that the electric storage device 5 may store electric power supplied from a power source or a battery other than the solar cell 4. For example, the electric storage device 5 may acquire electric power from an external power source through a port (not illustrated) or the like formed in the housing 2 and store the acquired electric power.

The circuit board 7 is a substrate on which electronic members performing each function of the communication device 1-4 are arranged. The circuit board 7, for example, may have an input receiving unit 81, a microcontroller not illustrated, and an IC chip (not illustrated). The circuit board 7 is arranged at a position facing the bottom surface 34 in the accommodating portion 31. Further, the electronic circuit is also arranged on the opposite surface to the bottom surface 34 in the accommodating portion 31. For example, the input receiving unit 81, a microcontroller (not illustrated), and an IC chip (not illustrated) may be arranged in the electronic circuit described above. Further, an electronic member necessary for the operation of the communication device 1-4 such as a power IC may be further arranged on the circuit board 7. The electronic member such as the input receiving unit 81 is accommodated in the dent 36 formed on the bottom surface 34 inside the accommodating portion 31. Note that an area of the circuit board 7 is not particularly limited. However, in a case in which the circuit board 7 is wide enough to cover an upper portion of the groove portion 35, there is a possibility of physical interference depending on the size of the electric storage device 5 installed in the groove portion 35. In order to prevent the interference between the circuit board 7 and the electric storage device 5, it is necessary to increase the depth of the groove portion 35, but in this case, the thickness of the housing 2 is also increased. For this reason, it is preferable that the circuit board 7 have a size that does not cover the upper portion of the groove portion 35. Further, the electronic member installed on the circuit board is driven by the electric power supplied from the electric storage device 5. Note that the electronic members may be supplied with electric power from an external power supply or a primary battery. The primary battery, for example, may be a button battery or a dry battery, and may be accommodated in the accommodating portion 31, the groove portion 35, or the like. When the primary battery is used as a power supply source, it is possible to reduce the frequency of charging and discharging associated with the use of the electric storage device 5. Thus, it is possible to suppress the speed of the performance deterioration of the electric storage device 5.

The input receiving unit 81 is installed at a position corresponding to the button 33 of the housing 2. The input receiving unit 81 has the function of the input receiving unit 71 according to the first embodiment of the present disclosure. Further, in a case in which the button 33 has a function of a display window, the input receiving unit 81 may also have the function of the display member 72 according to the first embodiment of the present disclosure. The input receiving unit 81 may be configured such that the respective functions of the input receiving unit and the display member are separately implemented. Further, an installation position of the input receiving unit 81 and the number of input receiving units 81 to be installed are not particularly limited.

The antenna is installed along the inner surface of the housing 2. The antenna may be affixed to the inner surface of the housing 2 using a bonding material or the like such as a film or may be fixed to the inner surface of the housing 2 using a pin or the like. A position of the antenna in the Z-axis direction is not particularly limited. For example, the antenna may be arranged to be positioned near the surface which is set as the upper surface brought close to the external communication device to perform communication with the external communication device among the respective surfaces of the housing 2. In the configuration illustrated in FIG. 14, the antenna is arranged at a position to surround the solar cell 4. In this case, when the communication device 1-4 is brought close to the external communication device using the surface formed by the protection member 3 as the upper surface, the communication sensitivity of the antenna can be increased.

The microcontroller and the IC chip (not illustrated) have the same functions as those of the respective constituent members of the first embodiment of the present disclosure, and thus description thereof is omitted.

The respective constituent members accommodated in the housing 2 are arranged in the order of the protection member 3, the solar cell 4, and the circuit board 7 in the Z-axis direction as illustrated in FIG. 14. The solar cell 4 is positioned so that the light receiving surface faces the protection member 3. The electric storage device 5 is accommodated in the groove portion 35 not to physically interfere with the solar cell 4 and the circuit board 7. The circuit board 7 is arranged to face the back surface of the light receiving surface of the solar cell 4 and the bottom surface 34 in the accommodating portion 31. Further, the circuit board 7 is arranged so that the electronic members present on the electronic circuit are accommodated in the dent 36 in the housing 2. Note that a positional relation between the circuit board 7 and the electric storage device 5 is not particularly limited as long as there is no physical interference. For example, the electric storage device 5 may be arranged to face the back surface of the light receiving surface of the solar cell 4.

The following operations and effects can be achieved through the arrangement of the respective constituent members according to the present embodiment illustrated in FIG. 14. First, according to the arrangement of the solar cell 4 according to the present embodiment, since the solar cell 4 is arranged to face the circuit board 7 and does not physically interfere with the electric storage device 5, the solar cell 4 does not interfere with other constituent members even though the size of the solar cell 4 is increased. In other words, it is possible to freely adjust the area of the light receiving surface of the solar cell 4 without considering the interference with other constituent members or electronic members in the internal space of the accommodating portion 31. Therefore, it is possible to maximize the area of the light receiving surface of the solar cell 4 even in the limited space inside the housing 2. Accordingly, it is possible to further increase the power generation amount of the solar cell 4.

Further, the electric storage device 5 is accommodated in the groove portion 35. Therefore, since the electric storage device 5 is accommodated in the groove portion 35, it is possible to prevent the physical interference with the solar cell 4 and the circuit board 7 and prevent a dead space for avoiding physical interference from being formed. For example, by arranging the circuit board 7 and the electric storage device 5 in parallel as illustrated in FIG. 14, it is possible to implement an arrangement in which the area of the light receiving surface of the solar cell 4 is maximized, and the thickness of the housing 2 is minimized.

Note that, although not illustrated in FIG. 14, the communication device 1-4 may have the magnetic sheet 6 in the housing 2. The function of the magnetic sheet 6 is the same as the magnetic sheet 6 according to the first embodiment of the present disclosure, and thus description thereof is omitted. The magnetic sheet 6 can be arranged on a side opposite to an upper surface of the housing 2 with reference to the position of the antenna installed on the inner surface of the housing 2 in the Z-axis direction. For example, in the example illustrated in FIG. 14, the antenna is arranged to surround the periphery of the solar cell 4. Therefore, the surface of the protection member 3 side becomes the upper surface. Thus, the magnetic sheet 6 may be arranged, for example, between the solar cell 4 and the circuit board 7. Accordingly, the antenna can improve the quality of communication with the external communication device through the upper surface.

[5-2. Modified Example of Configuration]

The configuration example of the communication device 1-4 according to the fourth embodiment of the present disclosure has been described above. Note that the internal configuration of the communication device 1-4 in relation to the present embodiment is not limited to this example. A modified example of the internal configuration of the communication device 1-4 in the present embodiment will be described below.

(Modified Example of Internal Configuration)

FIGS. 15A, 15B, 15C, and 15D are diagrams illustrating a modified example of the internal configuration of the communication device 1-4 according to the fourth embodiment of the present disclosure. As illustrated in FIGS. 15A, 15B, 15C, and 15D, respective constituent members such as a solar cell 4, an electric storage device 5, a magnetic sheet 6, a circuit board 7, and an antenna 82 are arranged in the housing 2 in various orders or forms. Here, a surface facing the direction opposite to the Z axis in FIGS. 15A, 15B, 15C, and 15D is referred to as a first surface, and a surface facing the Z-axis direction is referred to as a second surface. The second surface is a surface of the side on which an extended member 32 is present. Further, in each of examples illustrated in FIGS. 15A, 15B, 15C, and 15D, a configuration of the housing 2 is omitted.

Figure 15A:
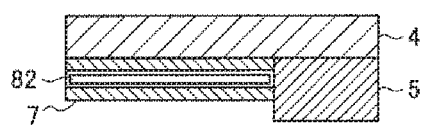
FIGS. 15A, 15B, 15C, and 15D are diagrams illustrating a modified example of the internal configuration of the communication device according to the fourth embodiment of the present disclosure.

First, in an example illustrated in FIG. 15A, the respective constituent members are arranged in the order of the solar cell 4 and the circuit board 7 in the Z-axis direction. The electric storage device 5 is arranged in parallel with the circuit board 7. Further, the antenna 82 is arranged on the surface of the circuit board 7 or in the circuit board 7. In this configuration, the antenna 82 performs communication using a radio wave regardless of a direction. When any one surface of the first surface, the second surface, and the side surface of the housing 2 is brought close to the external communication device as the upper surface, the communication device 1-4 is able to perform communication with an external communication device.

Figure 15B:
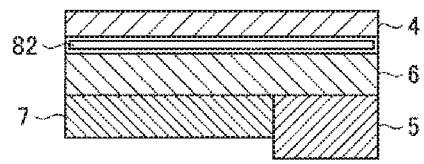

Next, in an example illustrated in FIG. 15B, the respective constituent members are arranged in the order of the solar cell 4, the magnetic sheet 6, and the circuit board 7 in the Z-axis direction. The electric storage device 5 is arranged in parallel with the circuit board 7. Further, the antenna 82 is arranged around the solar cell 4 or on the opposite surface of the magnetic sheet 6 to the solar cell 4. In this configuration, the antenna 82 performs communication using a radio wave in a direction in which the solar cell 4 is arranged. When the first surface of the housing 2 is brought close to the external communication device as the upper surface, the communication device 1-4 is able to perform communication with an external communication device. In the present modified example, since the magnetic sheet 6 is arranged, the quality of the communication by the antenna 82 can be improved.

Figure 15C:
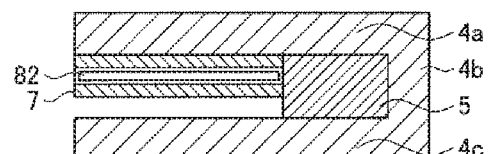

In an example illustrated in FIG. 15C, solar cells 4*a* to 4*c* are arranged to surround the circuit board 7 and the electric storage device 5. In other words, the solar cell 4*a* is arranged to face the first surface of the housing 2, the solar cell 4*b* is arranged to face the second surface of the housing 2, and the solar cell 4*c* is arranged to face at least one side surface of the housing 2. Each of the surfaces of the housing 2 corresponding to the respective light receiving surfaces of the solar cells 4*a* to 4*c* may have an opening portion, and a protection member 3 for protecting each opening portion may be formed appropriately. Further, the solar cells 4*a* to 4*c* arranged to face the respective surfaces may be separated one by one, or some or all of the solar cells 4*a* to 4*c* may be integrated. The electric storage device 5 is arranged in parallel with the circuit board 7. Further, the antenna 82 is arranged on the surface of the circuit board 7 or in the circuit board 7. In this configuration, a total area of the light receiving surfaces of the solar cells 4*a* to 4*c* is increased. Accordingly, it is possible to increase the power generation amount of the communication device 1-4. Note that the antenna 82 performs communication using a radio wave regardless of a direction. Thus, when any one surface of the first surface, the second surface, and the side surface of the housing 2 is brought close to the external communication device as the upper surface, the communication device 1-4 is able to perform communication with an external communication device. Note that a position of the antenna 82 is not particularly limited. For example, the antenna 82 may be arranged around the solar cell 4.

Figure 15D:
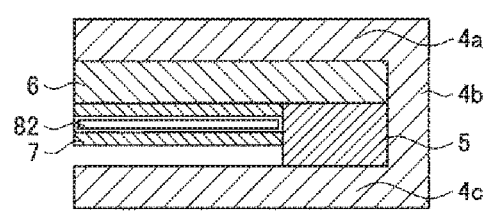

In an example illustrated in FIG. 15D, the solar cells 4*a* to 4*c* are arranged to surround the magnetic sheet 6, the circuit board 7, and the electric storage device 5. In other words, the solar cells 4*a* to 4*c* are arranged to face the first surface, the second surface, and at least one side surface of the housing 2. The electric storage device 5 is arranged in parallel with the circuit board 7. Further, the antenna 82 performs communication using a radio wave in a direction in which the solar cell 4 is arranged. When the first surface of the housing 2 is brought close to the external communication device as the upper surface, the communication device 1-4 is able to perform communication with an external communication device. In the present modified example, since the magnetic sheet 6 is provided, the quality of the communication by the antenna 82 can be improved.

The modified example of the internal configuration of the communication device 1-4 according to the fourth embodiment of the present disclosure has been described above.

Note that the modified example of the internal configuration of the communication device 1-4 according to the present embodiment is not limited to the configuration illustrated in FIGS. 15A, 15B, 15C, and 15D. For example, the extended member 32 may be able to accommodate one or more of the constituent members such as the solar cell 4. Accordingly, it is possible to reduce the volume of the accommodating portion 31 and further reduce the thickness of the housing 2. Further, the position of the antenna 74 is not particularly limited as long as the communication performance is secured, and for example, the antenna 74 may be arranged on the surface of the magnetic sheet 6, the surface of the circuit board 7 or in the circuit board 7, around the solar cell 4, the inner surface of the housing 2, or the like. Further, a plurality of antennas may be installed in the accommodating portion 31 or the extended member 32. Further, the presence or absence of the magnetic sheet 6, an area and a thickness of the magnetic sheet 6, and the like can be appropriately changed depending on the communication quality.

(Modified Example of External Configuration)

The communication device 1-4 according to the fourth embodiment of the present disclosure may have an external configuration such as a cuff link. More specifically, when a shape of the extended member 32 is a clasp-like shape, the communication device 1-4 can be clasped into a button hole of a shirt. The shape of the clasp is not particularly limited. Further, when the extended member 32 has a leaf spring-like structure, it is possible to pinch the pinched object such as a breast pocket of a shirt more firmly. The external configuration of the communication device 1-4 according to the present embodiment is not limited to the above example as long as the respective constituent members such as the solar cell 4 are arranged in the housing 2 in the order illustrated in FIGS. 15A, 15B, 15C, and 15D. Further, the arrangement position of the solar cell 4, the antenna, or the like can be changed appropriately depending on the external configuration of the housing 2 if the charging performance and the communication performance are ensured.

<6. Conclusion>

As described above, according to one embodiment of the present disclosure, the light receiving surface of the solar cell 4 is arranged to face the opening portion of the housing 2, and the respective constituent members are arranged in the order of the solar cell 4, the electric storage device 5, the magnetic sheet 6, and the circuit board 7. Accordingly, when the solar cell 4 is arranged in the housing 2, there is no interference with other constituent members or electronic members. In other words, since the size of the solar cell 4 can be freely increased, the communication device 1 can further increase the power generation amount by the solar cell 4. Thus, the user can increase the use frequency of the communication device 1. Further, according to each of the embodiments of the present disclosure, by arranging the electronic member on the opposite surface of the circuit board 7 to the housing 2, it is possible to reduce the thickness of the internal configuration of the housing 2 while securing the power generation amount by the solar cell 4. Thus, it is possible to keep the convenience of the user who carries the communication device 1 high.

Further, the communication device 1 can suppress the power consumption using the slide switch or the LED as the input member or the display member. Thus, it is possible to increase the use frequency of the communication device 1. Further, by preparing a plurality of color lights of the LED, it is possible to perform display related to various functions of the communication device 1.

Further, according to one embodiment of the present disclosure, the light receiving surface of the solar cell 4 is arranged to face the opening portion of the housing 2, and the respective constituent members are arranged in the housing 2 in the order of the solar cell 4 and the circuit board 7. The electric storage device 5 is accommodated in the groove portion 35 of the housing 2. Accordingly, it is possible to minimize the thickness of the housing 2 regardless of the shape of the electric storage device 5 while maximizing the area of the light receiving surface of the solar cell 4. Thus, the communication device 1 can keep the convenience of the user carrying the communication device 1 high while increasing the power generation amount by the solar cell 4.

Further, the housing 2 of the communication device 1 has the clip structure including the extended member 32 and the like. With this configuration, the communication device 1 pinches the pinched object such as the breast pocket. Accordingly, it is possible to carry the communication device 1 in a state in which the communication device 1 is hooked to the pinched object. Thus, it is possible to enhance the convenience of the user carrying the communication device 1.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in each of the above embodiments, the area of the light receiving surface of the solar cell 4 depends on the size of the inner space of the housing 2. Therefore, in another embodiment, it is possible to increase the area of the light receiving surface of the solar cell accordingly in a case in which the communication device is increased in size, that is, in a case in which the volume of the housing is increased. In this case, since the power generation amount of the solar cell is increased, the function of the communication device can be further increased. For example, it is possible to install an LCD as the display member on the circuit board or to install various members such as a switch and a touch panel as the input member.

Further, the communication device can be applied to settlement of electronic money, but the present technology is not limited to this example. For example, the communication device may be applied to personal authentication in access control, identity verification, or the like.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A communication device, including:
a solar cell including a light receiving surface configured to receive radiated light;
an electric storage device that is installed on a back surface of the light receiving surface; and
a circuit board that includes a communication antenna and is installed on a back surface of an opposite surface of the electric storage device to the solar cell (2)
The communication device according to (1), further including:
a housing configured to accommodate the solar cell, the electric storage device, and the circuit board, the housing including an opening portion at a position corresponding to the light receiving surface.

(3)
The communication device according to (2),
in which the housing includes at least one input member,
the circuit board faces an inner surface of the housing, and
an electronic circuit including an input receiving unit configured to receive an input from the input member is arranged on an opposite surface of the circuit board to the housing.

(4)
The communication device according to (3),
in which the input member includes at least one slide switch.

(5)
The communication device according to any one of (1) to (4), including:
at least one display member.

(6)
The communication device according to (5),
in which the display member is at least one LED.

(7)
The communication device according to (6),
in which the LED emits light of at least one color.

(8)
The communication device according to any one of (1) to (7), further including:
a magnetic sheet that is installed between the electric storage device and the circuit board to cover a part or a whole of the back surface of the electric storage device.

(9)
The communication device according to any one of (1) to (8),
in which the electric storage device includes a secondary battery.

(10)
The communication device according to any one of (1) to (9), further including:
a transparent protection member configured to cover the light receiving surface of the solar cell.

(11)
A communication device, including:
a solar cell including a light receiving surface configured to receive radiated light;
a circuit board that is installed on at least a part of a back surface of the light receiving surface;
an electric storage device configured to be able to store electric power generated by the solar cell; and
a communication antenna that is installed to surround a part or a whole of at least one of the solar cell, the circuit board, and the electric storage device.

(12)
The communication device according to (11), further including:
a housing configured to accommodate the solar cell, the circuit board, the electric storage device, and the communication antenna, the housing including an opening portion at a position corresponding to the light receiving surface.

(13)
The communication device according to (12),
in which an accommodating portion formed by a bottom surface facing the opening portion and a side surface extending from an edge portion of the bottom surface in a direction in which the opening portion is present, and an extended member which is partially connected to the accommodating portion and arranged to face the bottom surface of the accommodating portion with a predetermined gap in between are included.

(14)
The communication device according to (13),
in which at least a part of the bottom surface of the accommodating portion includes a groove, and
the electric storage device is installed in the groove.

(15)
The communication device according to any one of (12) to (14),
in which the communication antenna is installed along at least one inner surface of the housing.

(16)
The communication device according to any one of (11) to (15), further including:
a magnetic sheet.

(17)
The communication device according to any one of (11) to (16),
in which the electric storage device has a cylindrical shape or a button shape.

REFERENCE SIGNS LIST 1 communication device
2 housing
3 protection member
4 solar cell
5 electric storage device
6 magnetic sheet
7 circuit board
21, 25, 28 button
22, 26, 29 display window
23 ring loop
24 ring
27 slide switch
31 accommodating portion
32 extended member
33 button
35 groove portion
71 input receiving unit
72 display member
73 microcontroller
74, 82 antenna
75 acceleration sensor
81 input receiving unit

The invention claimed is:

1. A communication device, comprising:
a solar cell including a light receiving surface configured to receive radiated light;
an electric storage device on a back surface of the light receiving surface of the solar cell; and
a circuit board that includes a communication antenna and is on a back surface of a surface of the electric storage device which is opposite to the back surface of the light receiving surface of the solar cell.

2. The communication device according to claim 1, further comprising
a housing configured to accommodate the solar cell, the electric storage device, and the circuit board,
the housing including an opening portion at a position corresponding to the light receiving surface of the solar cell.

3. The communication device according to claim 2, wherein
the housing further includes:
at least one input member; and
an electronic circuit including an input receiving unit configured to receive an input from the at least one input member,
a first surface of the circuit board faces an inner surface of the housing, and
the electronic circuit is on a second surface of the circuit board which is a back surface of the first surface that faces the inner surface of the housing.

4. The communication device according to claim 3, wherein
the at least one input member includes at least one slide switch.

5. The communication device according to claim 1, further comprising
at least one display member.

6. The communication device according to claim 5,
wherein the at least one display member is at least one LED.

7. The communication device according to claim 6, wherein
the at least one LED is configured to emit light of at least one color.

8. The communication device according to claim 1, further comprising
a magnetic sheet between the electric storage device and the circuit board,
wherein the magnetic sheet is configured to cover a part or a whole of the back surface of the electric storage device.

9. The communication device according to claim 1, wherein
the electric storage device includes a secondary battery.

10. The communication device according to claim 1, further comprising
a transparent protection member configured to cover the light receiving surface of the solar cell.

11. A communication device, comprising:
a solar cell including a light receiving surface configured to receive radiated light;
a circuit board on at least a part of a back surface of the light receiving surface of the solar cell;
an electric storage device configured to store electric power generated by the solar cell; and
a communication antenna that surrounds a part or a whole of at least one of the solar cell, the circuit board, and the electric storage device.

12. The communication device according to claim 11, further comprising
a housing configured to accommodate the solar cell, the circuit board, the electric storage device, and the communication antenna,
the housing including an opening portion at a position corresponding to the light receiving surface of the solar cell.

13. The communication device according to claim 12, wherein
the housing further includes:
an accommodating portion formed by a bottom surface facing the opening portion and a side surface extending from an edge portion of the bottom surface in a direction in which the opening portion is present; and
an extended member which is partially connected to the accommodating portion and faces the bottom surface of the accommodating portion with a gap between the extended member and the bottom surface of the accommodating portion.

14. The communication device according to claim 13, wherein
   at least a part of the bottom surface of the accommodating portion includes a groove, and
   the electric storage device is in the groove.

15. The communication device according to claim 12, wherein
   the communication antenna is along at least one inner surface of the housing.

16. The communication device according to claim 11, further comprising
   a magnetic sheet between the solar cell and the circuit board.

17. The communication device according to claim 11, wherein
   the electric storage device has one of a cylindrical shape or a button shape.

\* \* \* \* \*